United States Patent [19]
Kloppenstein

[11] 3,848,688
[45] Nov. 19, 1974

[54] LIQUID-REPELLING SHIELD DEVICE
[75] Inventor: King L. Kloppenstein, Prospect Heights, Ill.
[73] Assignee: Triangle Package Machinery Company, Chicago, Ill.
[22] Filed: Oct. 26, 1973
[21] Appl. No.: 410,247

[52] U.S. Cl. .................. 177/179, 74/18.2, 277/53
[51] Int. Cl. ..... G01g 21/02, F16j 15/50, F02j 11/00
[58] Field of Search ............ 177/135, 179; 74/18.2, 74/826; 277/53

[56] References Cited
UNITED STATES PATENTS

| 1,257,553 | 2/1918 | Vogt | 177/135 |
| 1,411,502 | 4/1922 | Miller | 177/135 |
| 1,514,566 | 11/1924 | O'Neill | 177/135 |
| 1,780,804 | 11/1930 | Ward | 277/53 X |
| 2,410,340 | 10/1946 | Cronstedt | 277/53 X |

FOREIGN PATENTS OR APPLICATIONS

| 296,656 | 9/1928 | Great Britain | 277/53 |
| 305,285 | 2/1929 | Great Britain | 277/53 |

Primary Examiner—George H. Miller, Jr.
Attorney, Agent, or Firm—Root & O'Keeffe

[57] ABSTRACT

A liquid-repelling shield device located between two relatively movable members is disclosed, such as the housing of a weighing scale and the load-carrying member thereof, wherein a labyrinth is provided within the device to prevent the entrance of liquid into the housing, for example, when washing down the machine, such as a packaging machine, on which the scale is located.

17 Claims, 4 Drawing Figures

LIQUID-REPELLING SHIELD DEVICE

BACKGROUND OF THE INVENTION

1. Field of the Invention

The invention relates, particularly, to the structure of a liquid-repelling shield device, located between the movable load-carrying member of a weighing scale, and a housing for the weight sensing mechanism thereof for preventing the entry of liquid into the housing from outside. The invention is particularly useful in the field of packaging machines, where a flowable, solid material is fed onto a load-carrying member and then dumped into a package upon reaching a predetermined weight.

2. Description of the Prior Art

In the field of packaging machines, weighing scales are used for weighing a flowable material fed to the scale from a hopper, conveyor or the like, and upon reaching the desired weight, the material is dumped into a package.

Certain products, especially food products, such as frozen and other perishable foods are contaminable, and it is necessary to wash down the machine frequently to cleanse it of any particles of such food products which may have been deposited on parts of the machine, for example, due to spillage. Usually, water or other liquid under pressure, such as from a hose, is used for this purpose, and it is important that such liquid not reach the weight sensing mechanism and its associated electrical circuitry located within a housing.

The load-receiving member outside of the housing is connected to the weight sensing mechanism within the housing through an opening in the housing, and, heretofore, various devices have been used to prevent the entry of liquid into the housing. For example, both diaphragms and bellows have been used which are connected between the housing and the load-carrying member, and while they successfully repel such liquids, they are, nevertheless, unsatisfactory from the standpoint of scale performance. Any connection between the weigh cell housing, and the moving load-carrying means tends to adversely affect repeatability. Sealing devices likewise create friction, and therefore are unsatisfactory. Other attempts at creating a shield arrangement which will prevent entry of foreign matter into the housing in this type of application may be seen, for example, in the Marco, et al, U.S. Pat. No. 2,598,812 and in the Sher, et al, U.S. Pat. No. 3,080,936.

BRIEF SUMMARY OF THE INVENTION

The broad concept of the invention relates, generally, to a device or shield for preventing the entry of a liquid into one of two relatively movable members. More specifically, the invention relates to the aforesaid device, as it is applied to a weighing scale, wherein the weight sensing mechanism is within a housing, and the load-carrying member is outside of the housing, but connected to the weight sensing mechanism through the housing. The weight sensing mechanism in scales used in connection with package machines wherein product is fed to a scale for weighing, and then dumped into a package, must have the ability to return to the same position with a given weight on its load-receiving member, each and every time. This characteristic is known as the "repeatability" of the scale.

Liquid-repellant devices or shields should not interfere with this repeatability, and any such device actually connected to both the stationary and movable members, such as a diaphragm or bellows will have an adverse effect on this characteristic.

The aforementioned Marco, et al, patent shows a housing having an opening therein, and a neck portion around the opening. A tubular element on the load-carrying member surrounds the neck and is connected through the opening to the weight sensing mechanism. This avoids the problem of a direct connection between the stationary and movable members, but due to the open space between the neck and tubular element, the splashing of liquid from a spray or stream into the housing cannot be avoided.

The present invention, therefore, provides a novel form of shield device for the aforesaid purposes, which involves the mounting of inner and outer baffle members on the housing and load-carrying device respectively with a labyrinth arrangement between the two.

In a broad sense, one of the members of the shield device is mounted on the housing and has a plurality of concentric baffles and the other supports the load-carrying member and is therefore movable with respect to said one member. Even though liquid may force its way to within the outermost member on the housing, the labyrinth arrangement therein will prevent such liquid from reaching the weight sensing mechanism.

More specifically, the invention provides a shield to prevent the entry of liquid into the housing of the weight sensing mechanism of a scale through an opening in the housing, wherein an inner tubular element is mounted on the housing around the opening, and an outer skirted cover, which supports the load-carrying member, is mounted on the weight sensing mechanism, and surrounds the inner tubular element, and wherein means are provided between the inner element and outer cover which form a labyrinth.

The labyrinth may take any suitable form, but, in the present instance, a multiple stage concentric baffle arrangement is mounted on the housing or stationary member with means to drain liquid from the inner to the outer stages. The complexity of the labyrinth is further enhanced by providing the inner surface of the outer skirted cover with an axially extending baffle, located between the stages of the multiple stage concentric baffle arrangement.

DETAILED DESCRIPTION OF THE INVENTION

Figure 1:
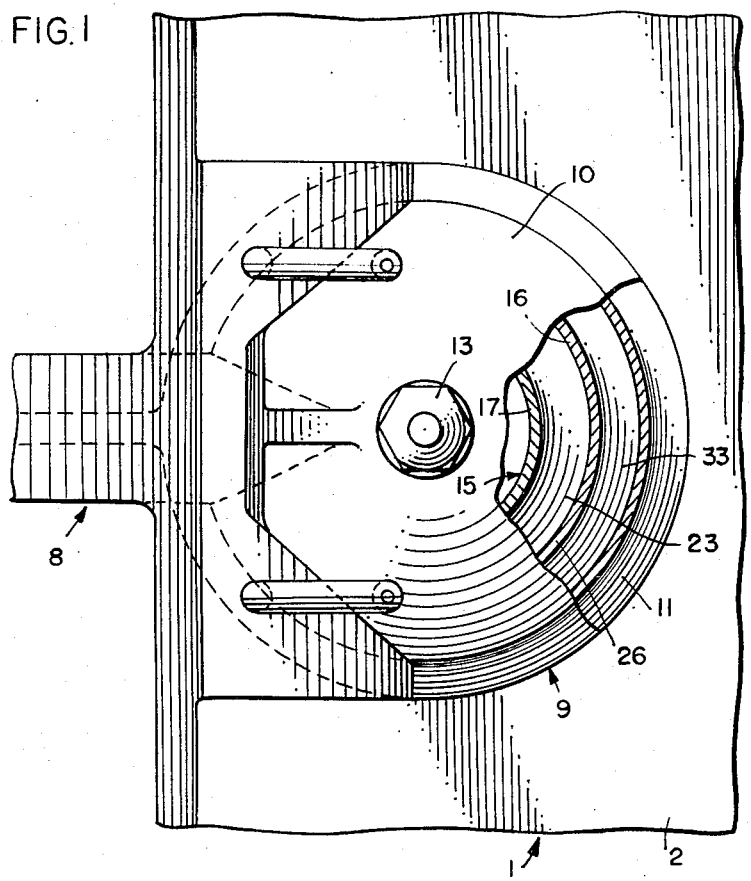
FIG. 1 is a fragmentary plan view of the housing of a weighing scale, illustrating the shield of the present invention in plan, but with parts broken away to show the interior thereof.
Figure 2:
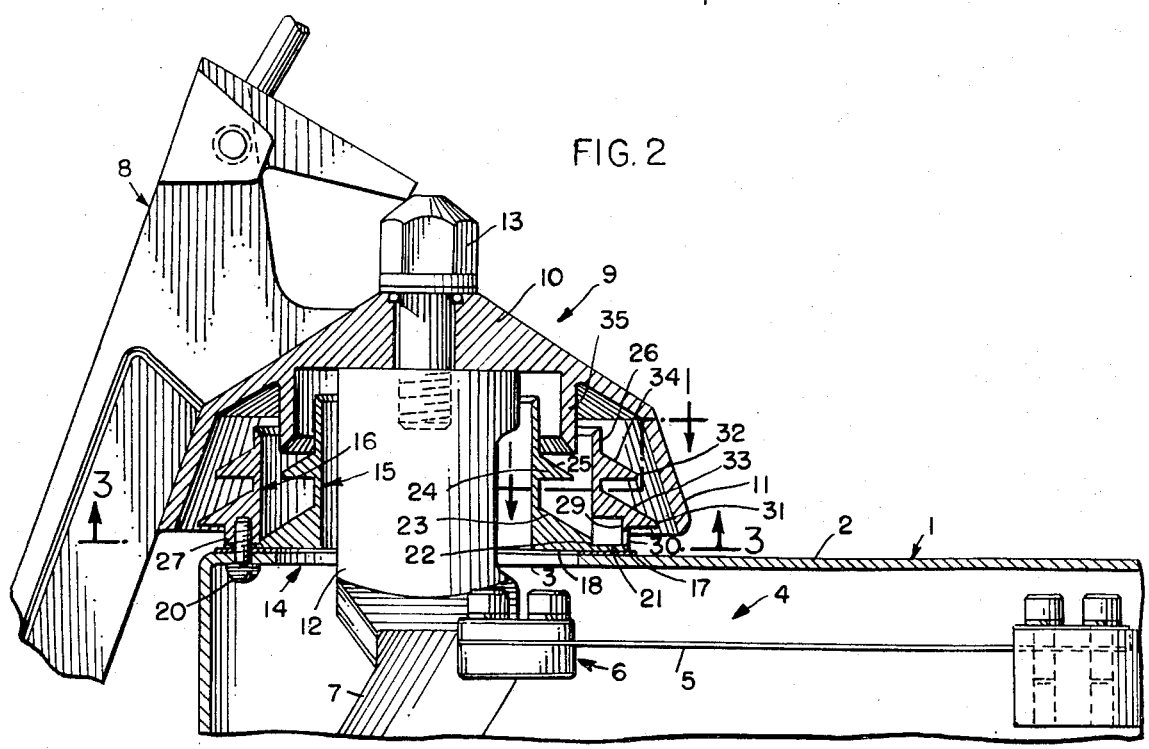
FIG. 2 is a vertical sectional view taken along the plane of line 2—2 of FIG. 3 through the shield device, and showing other parts of the scale in elevation.

Referring now more particularly to the drawings and especially to FIGS. 1 and 2, the invention is illustrated in combination with a weighing scale of the type intended to be used in connection with packaging machines, wherein flowable material is fed to a weigh bucket, or other suitable load-carrying means from a hopper or conveyor means. Usually, the weight of the material to be packaged is predetermined and the scale is set to weigh this amount. When the predetermined weight is reached, the material is dumped from the weigh bucket into the package or other proper container.

The load-carrying member is affixed to or mounted on a weight sensing mechanism enclosed within a housing. Since the connection between the load-carrying member and the weight sensing mechanism must pass through an opening in the housing, it is important that some means be provided to prevent liquid from entering the housing and reaching the weight sensing mechanism when the machine and its housing are being washed down, such as, for example, by the use of a hose or other forcible spray means.

For maximum repeatability of the scale, it has been determined that there should not be any shield member connected both to the housing, and to the load-carrying member.

It will be evident that the liquid-repelling shield device of the present invention may be useful for any two relatively movable members where it is desired to prevent liquid from reaching to the inside of one of the members. The invention is particularly useful in connection with a weighing scale, as pointed out above, and is therefore so illustrated herein.

In the drawings, the enclosure or housing for the weight sensing mechanism is shown only partially, and is generally indicated by the numeral 1. This housing is shown as having a top closure portion 2, having an opening 3 therethrough. Within the housing, there is provided a weight sensing member, generally indicated at 4. The construction of this weight sensing member forms no part of the invention and may take any desired form. It is illustrated herein as consisting of a plurality of horizontally disposed flexure members, one of which is indicated by the numeral 5. Other devices could be used, such as the knife-edge pivot as shown, for example in the aforementioned Marco, et al, patent.

At one end of the flexure member 5, there is a clamp 6 to which is secured a movable support 7, connected at its other end to another flexure. The load-carrying member may take any desired form, such as a weigh platter or a weigh bucket. As shown here, the invention is designed for use in connection with a weigh bucket (not shown) which is mounted on a bracket 8, which is, in turn, mounted on or integral with the liquid-repelling shield device of the invention, generally indicated by the numeral 9. As will be pointed out hereinafter, this shield device comprises an outer skirted member having a cover portion 10, and a skirt portion 11. A connecting column member 12 extends from the upper end of the support 7, upwardly through the opening 3, and is connected at its other end to the cover 10 of the skirted member, by means such as the bolt 13.

Thus far, it will be seen that when material is placed in the weigh bucket, it will move the flexures 5 or other weight sensing mechanisms, downwardly by reason of the connection of the load-carrying member thereto through the skirted cover and connecting column member 12. It will be noted that the lower edge of the skirted portion 11 is normally spaced above the top 2 of the housing, thereby permitting relative movement between the skirted cover and connecting column member 12. It will be noted that the lower edge of the skirted portion 11 is normally spaced above the top 2 of the housing, thereby permitting relative movement between the skirted cover and the housing.

The invention herein is directed, primarily, to the novel means consisting of a labyrinth arrangement located within the confines of the skirted cover, which will prevent liquid from entering into the housing, even though it may enter the space between the cover and the housing.

By providing this labyrinth, liquid which is forced into the area below the skirted cover is prevented from reaching the opening 3 in the housing because of the tortuous path which it must follow. As will be seen hereinafter, suitable openings are provided so that any liquid which does reach an inner baffle will be drained outwardly through an outer baffle member, and thus will not become trapped therein.

The shield may be broadly termed a multiple stage concentric baffle member with means to drain liquid from the inner to the outer stages thereof. More specifically, this multiple concentric baffle is generally indicated by the numeral 14 (see FIG. 2), and consists of a plurality of inner and outer tubular members having interruptions on the outer surfaces thereof such as annular flanges or baffles. As many of these concentric tubular baffle members may be used, as desired, but two such members have been shown herein.

The inner tubular element or stage is indicated generally at 15, and the outer one is indicated generally at 16. The inner stage 15 is mounted on the top 2 of the housing, around the opening 3 therein, and is provided with a gasket or seal 17 interposed between the tubular element and the housing.

This inner stage or baffle member 15 is preferably provided with an outwardly extending flange 18, around the bottom thereof, with openings 18 therein adapted to receive fastening means, such as screws 20, to secure this inner baffle member to the housing.

This flange 18, on the upper surface thereof, is provided with a flat ledge portion 21, extending inwardly for a short distance from the outer edge thereof for a purpose which will presently become apparent. The inner edge of this ledge 21 terminates in a shoulder portion 22, which extends axially for a short distance, and the surface then proceeds inwardly and upwardly to provide the inclined surface 23.

It will be noted in FIG. 2 that the inner stage or baffle member has the tubular wall thereof extending upwardly around the connecting column member 12, and terminates short of the top 10 of the skirted cover. Between the upper end of this inner member 15 and the inclined surface 23 there is provided at least one surface interruption such as the annular baffle member 24, the under surface of which will repel liquid and dispense it laterally, which may enter from a direct spray through drain holes referred to hereinafter. The baffle also has a downwardly and outwardly inclined upper surface 25 to enable any liquid which might reach that point to be drained therefrom.

The second or outer tubular member 16, which constitutes the outermost one of the multiple stage baffle is arranged concentrically with the inner member 15, and is adapted to be mounted thereon and secured thereto.

Figure 3:
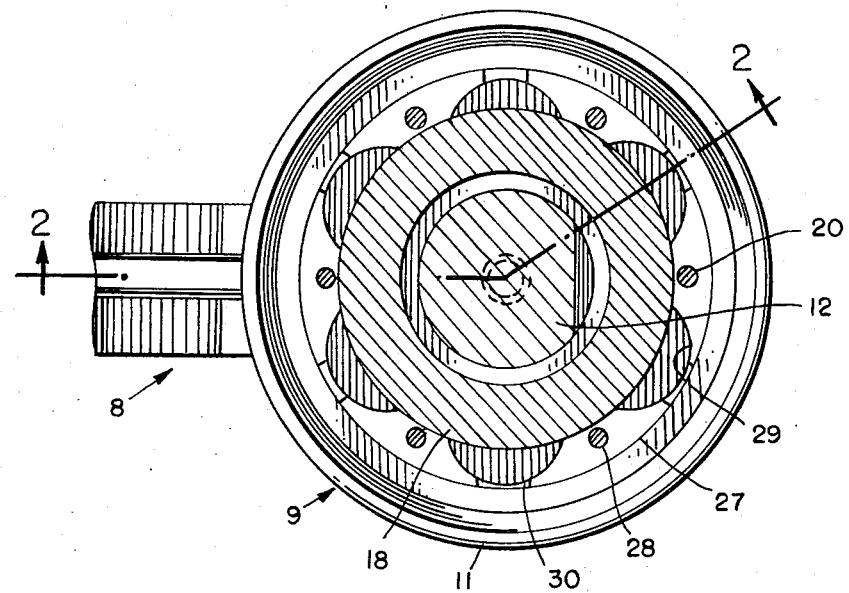
FIG. 3 is a horizontal sectional view through the device of the invention, taken along the plane of line 3—3 of FIG. 2.
Figure 4:
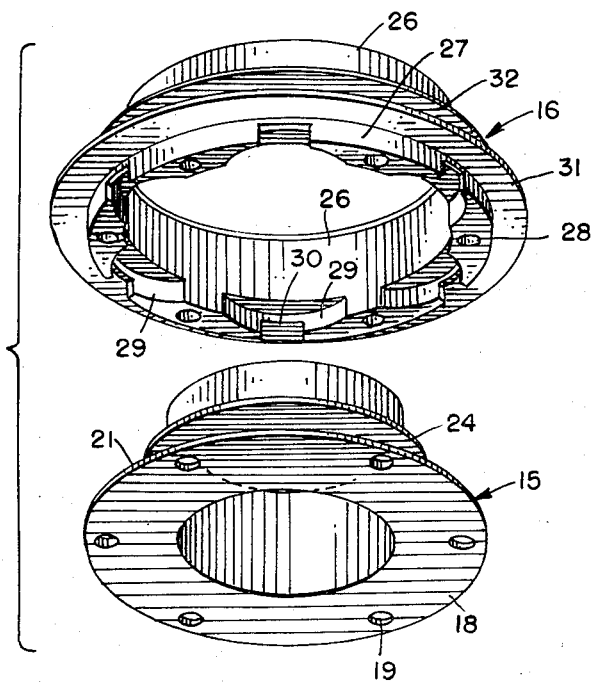
FIG. 4 is an exploded view of the tubular members forming the stages of the multiple stage baffle arrangement which form the inner tubular element of the shield assembly.

This outer stage is also tubular, and has the axially extending wall 26 thereof spaced outwardly from the inner tubular baffle member, and the one or more baffles 24 thereon. Referring to FIG. 2, the bottom of this outer member 16 is of such size as to snugly fit and rest upon the ledge 21 of the inner member. This portion of the outer member is indicated at 27, and the configuration thereof may be seen more clearly in FIGS. 3 and 4. The underside of this portion 27 is provided with a plurality of threaded holes 28, which may be brought into alignment with the holes 19 in the ledge 21 of the inner member 15, so that the screws 20 act to secure the assembly of the inner and outer members 15 and 16 to the top 2 of the housing 1.

The inner surface of the wall 26 at the bottom thereof is provided with a plurality of circumferentially spaced, cut-away portions 29. Each of these cut-away portions 29 has a cut-out 30, intermediate the ends thereof, which form openings with the ledge 21 of the inner member when the two members are in assembled relation, as may also be seen in FIG. 2. The surface of each of these cut-away portions has a configuration which cooperates with the inclined surface 23 and will act as a funnel to direct liquid from the inner stage to its associated opening 30 and thus facilitate drainage, and the size of such opening is such as to minimize entry of liquid therethrough. Thus, the inclined surface acts through gravity to aid in directing liquid outwardly, and the configuration of the cut-away portions acts as a funnel to accumulate the liquid from the inclined surface. While the combination of these two functions produces the best result, it will be recognized that either the funnel effect or the inclined surface could be used without the other. For example, the inclined surface could be provided within each opening by merely sloping them downwardly and outwardly.

The outer surface of the wall 26 is provided with suitable surface interruptions such as a plurality of annular baffle members 31 and 32 in axially spaced relation. The under surfaces of the baffles 31 and 32 will repel liquid which forcibly enters the area within the cover through the space between the housing and the bottom edge of the skirt 11. The annular baffle 31 has an outwardly and downwardly inclined surface 33, and the baffle 32, likewise has the upper surface 34 thereof outwardly and downwardly inclined for drainage purposes. It will be evident that as many stages can be provided as may become necessary, to achieve the desired result of preventing entrance of liquid into the inside of the inner tubular baffle member. It is only for purposes of illustration herein that the two stages consisting of the inner member 15 and the outer member 16 have been shown.

In order to complete this labyrinth, there is provided an annular baffle member 35, which extends in an axial direction, downwardly from the inner surface of the top 10 of the skirted cover. This annular baffle 35 is positioned between the walls of the inner stage 15, and the outer stage 16, to provide an additional barrier against the passage of liquid.

With this construction, it will be evident that the load-carrying member and the weight sensing mechanism can move freely, since there is no connection between this assembly, and the housing. Thus, repeatability is not affected.

In the assembled relationship of the various parts, as shown in FIG. 2, it has been established by actual tests that when liquid under pressure is applied to the housing, the solid portions between the openings 30 on the annular wall 27 will repel the liquid. If the force is sufficient, however, some of the liquid will enter the openings 30 to the area between the inner and outer baffle members. Also, the under surfaces of the baffles 31 and 32 will repel a considerable amount of liquid, and prevent it from reaching to within the outer stage by dispersing it in a lateral direction, but if the force is sufficient, some of the liquid will splash or be sprayed upwardly through the space between the baffles 31 and 32, and the skirt 11 and will eventually be directed downwardly along the outer surface of the baffle 35 to the area within the outer baffle member 16.

Some of the liquid which passes the annular baffles 31 and 32 will drop downwardly onto the inclined upper surfaces thereof, and drain back to the outside of the housing. Any liquid which reaches the area within the outer annular baffle member 16, if it reaches either or both of the surfaces 25 and 23, will be drained downwardly and outwardly through certain of the openings 30 other than those through which the spray is entering.

It has thus been found that the labyrinth arrangement of the present invention has the advantage of providing a liquid-repelling shield between the two relatively moving elements without providing any connection between these elements which would adversely affect the repeatability of the scale.

It will be evident that, although these various stages and baffle members have been described herein as being annular or tubular, they need not necessarily be circular. Both the skirted cover and the multi-stage concentric baffles could assume a multi-sided contour, if desired, without affecting the operability of the invention.

It will likewise be evident that the relative movement between the skirted cover and the inner members need not necessarily be an axial direction to be effective, since there could be other relative movements, such as rotary or laterally.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. A liquid repelling shield device for use between two relatively movable members, comprising,
    a. an arrangement of inner and outer tubular elements mounted on one of said members, and
    b. an outer, skirted cover, mounted on the other of said members and having the skirt portion thereof surrounding said tubular elements in spaced relation thereto,
    c. whereby the space within said inner element will be protected against the entry of liquid under pressure thereinto, and still allow freedom of movement between said members.

2. The combination of elements defined in claim 1 including means to drain liquid from the innermost to and beyond the outermost elements.

3. A liquid-repelling shield device for use between two relatively movable members, comprising,
   a. a plurality of spaced apart concentric ring elements mounted on one of said relatively movable members,
   b. a skirted cover mounted on the other of said members covering and surrounding said ring elements and having axially extending baffle means on the inner surface thereof positioned between adjacent ring elements,
   c. said ring elements and baffle means cooperating to form a labyrinth within the confines of said skirted cover to prevent entrance of liquid into the area within the innermost one of said ring elements.

4. The combination of elements defined in claim 3, including means to drain liquid from the innermost one of said ring elements to and beyond the outermost one of said ring elements.

5. The combination of elements defined in claim 3, including baffle means extending from one of the surfaces of at least one of said ring elements.

6. A liquid-repelling shield device for use between a stationary member and a movable member, comprising,
   a. a plurality of spaced apart concentric ring elements mounted on the stationary member,
   b. baffle means extending outwardly from the outer surface of at least one of said ring elements,
   c. a skirted member mounted on said movable member, covering and surrounding said ring elements and having axially extending baffle means on the inner surface thereof positioned between adjacent ring elements,
   d. all of said baffle means cooperating to form a labyrinth within the confines of said skirted cover to prevent the entrance of liquid into the area within the innermost one of said ring elements.

7. The combination of elements defined in claim 6, wherein each of said baffle means on said ring elements includes an annular rib having a downwardly sloping surface thereon for draining off liquid thereon.

8. The combination of elements defined in claim 6, including openings in the wall of the outermost one of said ring elements adjacent the stationary member on which it is mounted, for drainage of liquid therethrough.

9. The combination of elements defined in claim 8, including means cooperating with said openings to maximize drainage of liquid outwardly therethrough and minimize entry of liquid inwardly therethrough.

10. The combination of elements defined in claim 9 wherein said last named means comprises an outwardly and downwardly inclined surface associated with said openings.

11. The combination of elements defined in claim 9 wherein said last named means comprises surfaces in said outermost one of said ring elements converging toward said openings from opposite sides thereof.

12. In a weighing scale having a housing, a movable weight sensing mechanism within said housing, and a loadcarrying member outside of said housing connected to said weight sensing mechanism, a liquid-repelling shield device between said housing and said load-carrying member, comprising,
   a. a skirted cover positioned above said housing,
   b. means mounting said cover on said weight sensing mechanism for movement therewith and with respect to said housing,
   c. means mounting said load-carrying member on said skirted cover for movement therewith, and,
   d. means providing multiple stage concentric baffles mounted on said housing and forming a labyrinth within the confines of said skirted cover to prevent the entrance of liquid into said housing.

13. The combination of elements defined in claim 12, wherein said last named means includes a tubular member having a plurality of radially spaced annular walls, and an annular baffle member on at least one of said walls.

14. The combination of elements defined in claim 13, wherein each of said baffle members has a downwardly and outwardly sloping surface thereon for draining liquid therefrom.

15. The combination of elements defined in claim 14, combined with openings in the outermost wall of said tubular member through which liquid may drain from within said wall.

16. The combination of elements defined in claim 15, including means cooperating with said openings to maximize drainage of liquid outwardly therethrough and minimize entry of liquid inwardly therethrough.

17. A liquid repelling shield device for use between two relatively movable members, comprising
   a. an inner tubular element mounted on one of said members,
   b. an outer, skirted cover mounted on the other of said members and having the skirt portion thereof surrounding said inner tubular element in spaced relation thereto, and
   c. interruptions on the outer surface of said inner element and cooperating interruptions on the inner surface of said outer skirted cover forming a labyrinth in the space between said inner element and said skirted cover, thereby to prevent liquid entering said space from reaching to within said inner element, and still allow freedom of movement between said members.

* * * * *